(12) United States Patent
Ryu

(10) Patent No.: US 7,551,845 B2
(45) Date of Patent: Jun. 23, 2009

(54) METHOD FOR REPRODUCING OPTICAL DISC HAVING PLURALITY OF TITLES

(75) Inventor: Han Seop Ryu, Suwon-si (KR)

(73) Assignee: LG Electronics Inc., Seoul (KR)

( * ) Notice: Subject to any disclaimer, the term of this patent is extended or adjusted under 35 U.S.C. 154(b) by 854 days.

(21) Appl. No.: 10/623,774

(22) Filed: Jul. 22, 2003

(65) Prior Publication Data
US 2004/0120226 A1 Jun. 24, 2004

(30) Foreign Application Priority Data
Jul. 22, 2002 (KR) .................. 10-2002-0043049
Feb. 4, 2003 (KR) .................. 10-2003-0006938

(51) Int. Cl.
*H04N 5/00* (2006.01)
(52) U.S. Cl. ............................................. 386/126
(58) Field of Classification Search ............ 386/69, 386/125–126, 65, 45, 68, 95
See application file for complete search history.

(56) References Cited

U.S. PATENT DOCUMENTS 6,343,180 B1 * 1/2002 Kim ........................ 386/65
7,257,313 B2 * 8/2007 Jeong ...................... 386/68
2002/0024893 A1 * 2/2002 Hashimoto ............... 369/30.32

FOREIGN PATENT DOCUMENTS

KR 10-0182439 12/1998
KR 10-0254610 2/2000

OTHER PUBLICATIONS

Korean Office Action dated Jun. 27, 2005.

* cited by examiner

*Primary Examiner*—Thai Tran
*Assistant Examiner*—Tat Chi Chio
(74) *Attorney, Agent, or Firm*—Ked & Associates LLP

(57) ABSTRACT

A method for reproducing an optical disc having a plurality of titles. The method is capable of, when an all disc repeat play operation or an all disc successive play operation is performed with respect to a plurality of optical discs loaded in a multi-disc changer, or when an instant play operation is performed in a general optical disc player, omitting a still mode operation of outputting and displaying a title menu picture regarding titles recorded on each disc, and selecting and reproducing any one of the titles with reference to respective playback times of the titles, thereby efficiently preventing the all disc repeat play operation, all disc successive play operation or instant play operation from being interrupted due to the display of the menu picture.

13 Claims, 8 Drawing Sheets

METHOD FOR REPRODUCING OPTICAL DISC HAVING PLURALITY OF TITLES

BACKGROUND OF THE INVENTION

1. Field of the Invention

The present invention relates to a method for reproducing an optical disc having a plurality of titles, which successively or repeatedly plays all optical discs seated respectively in slots of a multi-disc changer capable of loading a plurality of optical discs therein at the same time, or instantly plays an optical disc loaded in a general optical disc apparatus, such as a digital versatile disc (DVD).

2. Description of the Related Art

FIG. 1 is a block diagram schematically showing the construction of a general multi-disc changer.

As shown in FIG. 1, the general multi-disc changer comprises a multi-tray 10 including a plurality of slots 101, 102, 103 and 104 for seating a plurality of optical discs therein at the same time, respectively, and a servo system 20 for rotating the multi-tray 10 and the optical discs seated respectively in the slots 101, 102, 103 and 104 thereof.

The multi-disc changer further comprises an optical pickup 30 for reading signals recorded on the optical discs seated respectively in the slots 101, 102, 103 and 104, and a video disc player (VDP) system 40 for processing the signals read by the optical pickup 30.

The VDP system 40 is adapted to, if a user selects a desired one of the optical discs in the slots 101~104 of the multi-tray 10 and requests playback of the selected disc, identify a number of the slot corresponding to the selected optical disc and rotate the selected optical disc to a position readable by the optical pickup 30.

The VDP system 40 then processes a radio frequency (RF) signal read by the optical pickup 30 and outputs the resulting signal to an external device connected thereto, such as a television set or audio set. As a result, the user can select and play a desired one of the plurality of optical discs loaded in the multi-disc changer.

The VDP system 40 is also adapted to, if the user requests an 'all disc repeat play operation', sequentially reproduce the optical discs in the slots while sequentially rotating the slots.

As a result, the user can sequentially and repeatedly play all the optical discs loaded in the multi-disc changer in a simple and convenient manner.

However, a compact disc (CD)-series disc has a characteristic of being reproducible just after its recognition, but a DVD-series optical disc has a characteristic of being reproducible only after a DVD title menu picture as shown in FIG. 2 is outputted and displayed in a still mode with reference to initially read navigation information and a user selects and requests playback of a desired title displayed in the DVD title menu picture. For this reason, the general multi-disc changer has a disadvantage in that the all disc repeat play operation requested by the user cannot be successively performed in the case where a DVD-series optical disc is seated in any one slot of the multi-disc changer.

Similarly, an optical disc apparatus, such as a general DVD player, outputs and displays a DVD title menu picture as shown in FIG. 2 in the still mode with reference to initially read navigation information in the case where a DVD-series optical disc is loaded therein. For this reason, a user has the inconvenience of having to select a desired title and request playback of the selected title.

SUMMARY OF THE INVENTION

Therefore, the present invention has been made in view of the above problems, and it is an object of the present invention to provide a method for reproducing an optical disc having a plurality of titles, which is capable of, when an all disc repeat play operation or an all disc successive play operation is performed with respect to a plurality of optical discs loaded in a multi-disc changer, or when an instant play operation is performed in a general optical disc player, omitting a still mode operation of outputting and displaying a title menu picture regarding titles recorded on each disc, and selecting and reproducing any one of the titles with reference to respective playback times of the titles.

In accordance with one aspect of the present invention, the above and other objects can be accomplished by the provision of a method for reproducing an optical disc having a plurality of titles, comprising the steps of a) detecting respective playback times of the titles of the optical disc; and b) selecting and reproducing any one of the titles of the optical disc with reference to the detected title playback times.

In accordance with another aspect of the present invention, there is provided a method for reproducing an optical disc having a plurality of titles, comprising the steps of a) receiving a user's request to perform an all disc successive play operation with respect to a plurality of discs loaded in an optical disc apparatus; b) identifying a type of a specific disc to be currently reproduced among the plurality of discs; c) if the identified disc type corresponds to the optical disc having a plurality of titles, detecting respective playback times of a plurality of titles of the specific disc; and d) selecting and reproducing any one of the titles of the specific disc with reference to the detected title playback times.

In accordance with a further aspect of the present invention, there is provided a method for reproducing an optical disc having a plurality of titles, comprising the steps of a) performing an all disc repeat play operation under the condition that a plurality of optical discs are loaded in a multi-disc changer; b) identifying a type of a specific optical disc to be currently reproduced during the all disc repeat play operation; and c) if the identified optical disc type corresponds to a DVD, omitting a still operation based on navigation information of the DVD and reproducing A/V data corresponding to at least one of a plurality of titles recorded on the DVD.

In accordance with yet another aspect of the present invention, there is provided a method for reproducing an optical disc having a plurality of titles, comprising the steps of a) identifying a type of a specific optical disc located at a position readable by an optical pickup when an all disc repeat play mode is set in a multi-disc changer under the condition that a plurality of optical discs including the specific optical disc are loaded in the multi-disc changer, the changer being adapted to wait at a menu picture before or after DVD reproduction in a general play mode; b) if the identified optical disc type corresponds to a DVD, forcibly reproducing any one of a plurality of titles recorded on the DVD on the basis of navigation information of the DVD; c) terminating the reproduction of the DVD by force if the title reproduction is completed; and d)

rotating a multi-tray in order for the disc seated in a next slot to be located at the position readable by the optical pickup.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Figure 3:
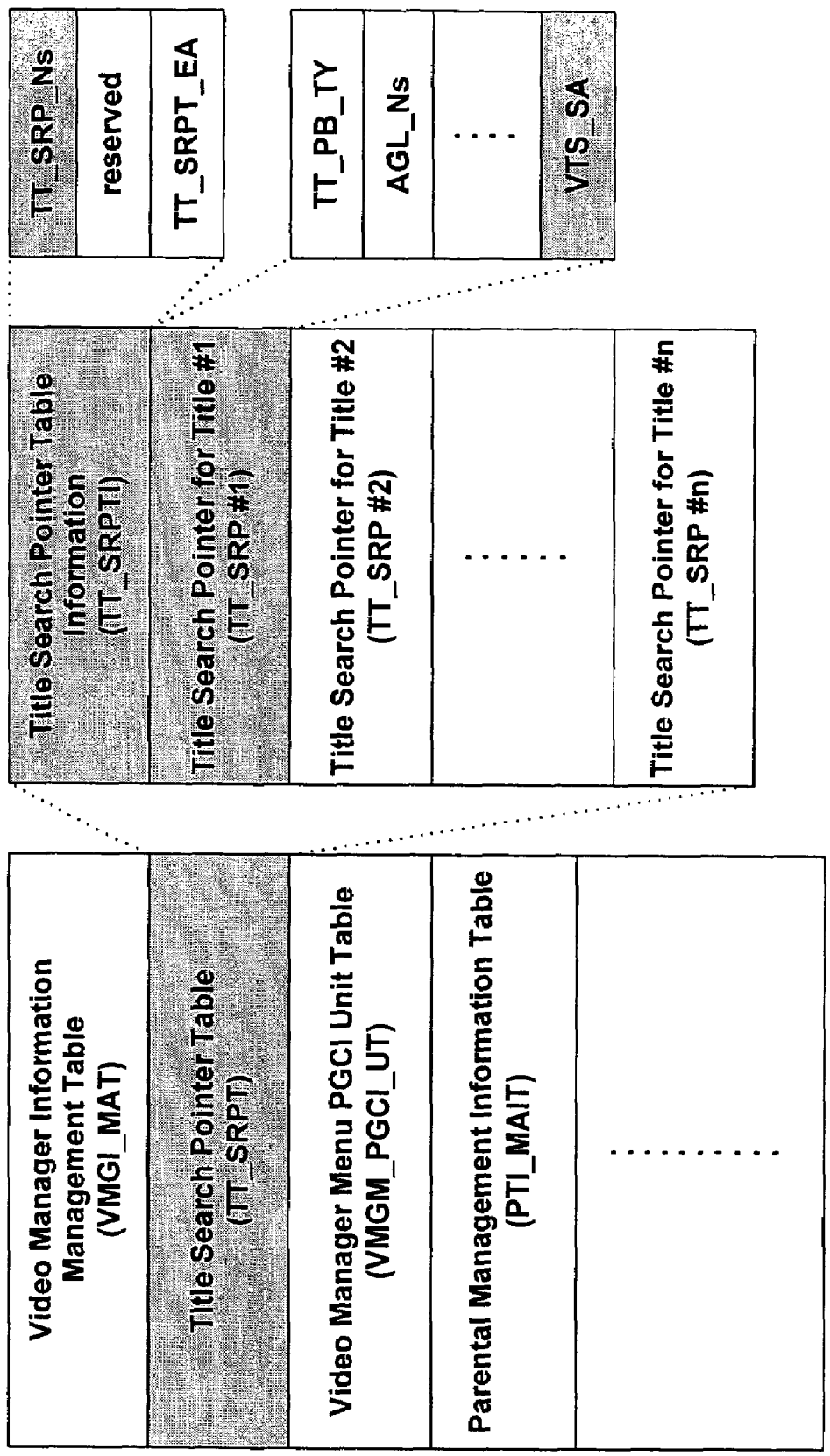
FIGS. 3 to 5 are views showing navigation information used in a method for reproducing an optical disc with a plurality of titles according to the present invention.
Figure 4:
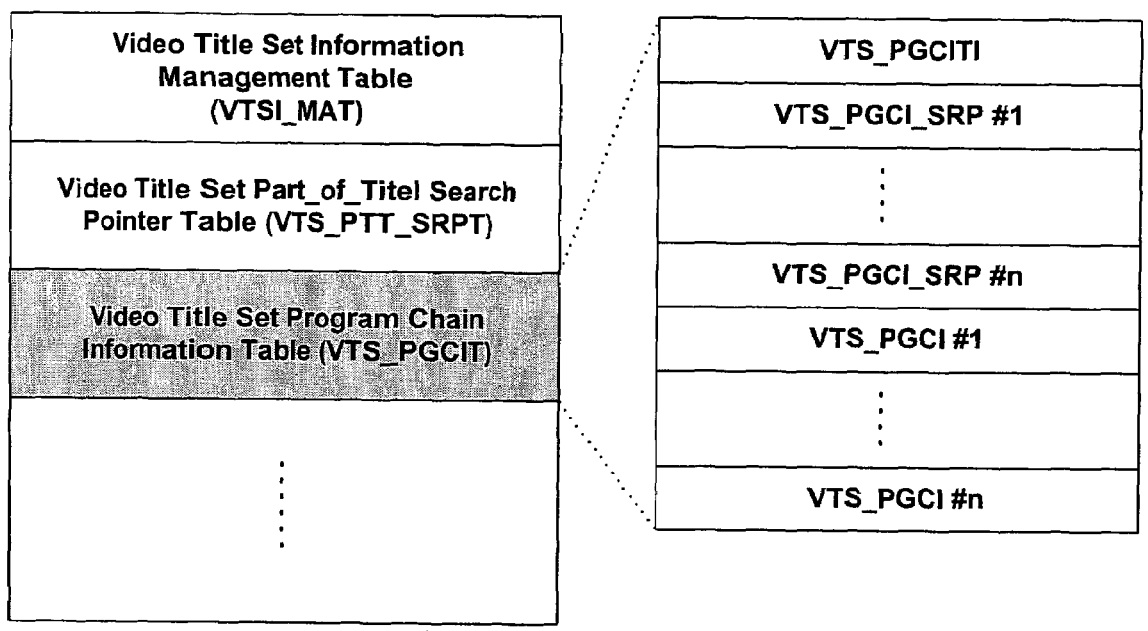
Figure 5:
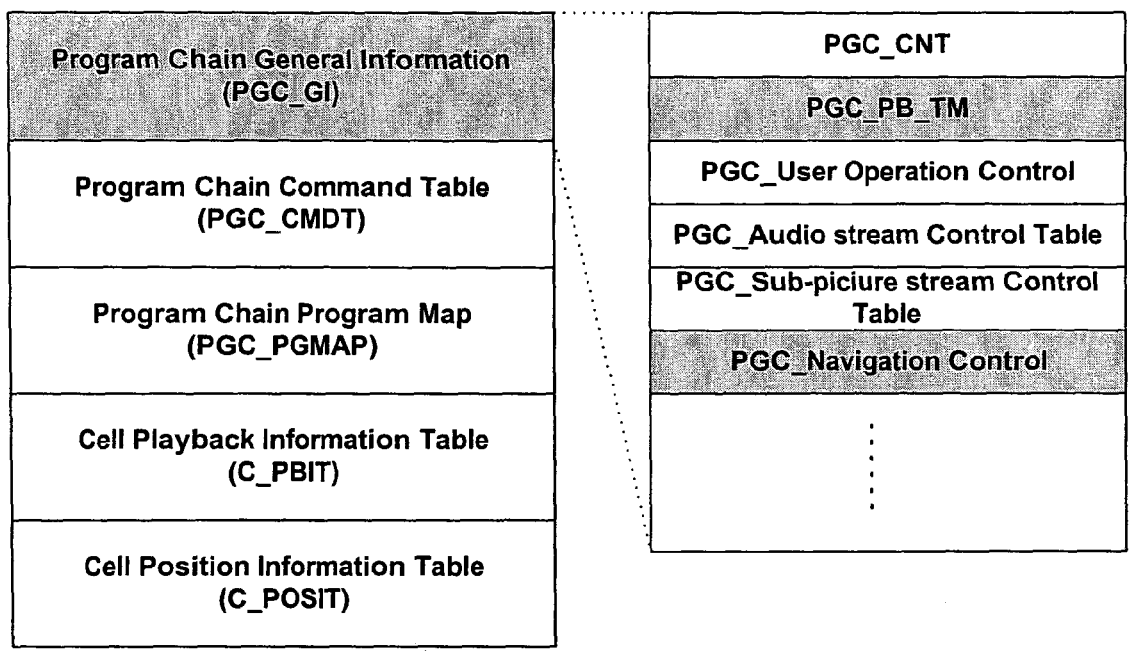

FIGS. 3 to 5 show navigation information used in a method for reproducing an optical disc with a plurality of titles according to the present invention.

Navigation information read from the optical disc, such as a DVD, includes, as shown in FIG. 3, a title search pointer table TT_SRPT including title search pointer table information TT_SRPTI and title search pointers for respective titles TT_SRP #1~TT_SRP #n.

The title search pointer table information includes the number of the title search pointers TT_SRP_Ns and an end address of the title search pointer table TT_SRPT_EA. The title search pointers each include a title playback type TT_PB_TY, the number of angles AGL_Ns and a start address of a video title set VTS_SA.

The navigation information further includes, as shown in FIG. 4, a video title set program chain information table VTS_PGCIT. The video title set program chain information table includes video title set program chain information table information VTS_PGCITI, a plurality of video title set program chain information search pointers VTS_PGCI_SRP #1~VTS_PGCI_SRP #n and a plurality of video title set program chain information VTS_PGCI #1~VTS_PGCI #n.

The navigation information further includes, as shown in FIG. 5, program chain general information PGC_GI. The program chain general information includes a program chain playback time PGC_PB_TM and a program chain navigation control information PGC_Navigation Control.

The VDP system 40, which is provided in a multi-disc changer or an optical disc apparatus such as a general DVD player, is adapted to select and reproduce a main title with a longest playback time recorded on the DVD with reference to the DVD navigation information including the various information as described above.

For example, the VDP system 40 detects the number of titles recorded on the DVD by referring to the number of title search pointers TT_SRP_Ns included in the title search pointer table information TT_SRPTI as stated previously with reference to FIG. 3. Further, by referring to a start address of a video title set VTS_SA included in each of the title search pointers TT_SRP #1~TT_SRP #n as stated previously with reference to FIG. 3, the VDP system 40 retrieves video title set information VTS_Information (VTSI) including management information for each video title set.

Note that a plurality of video titles may exist in each video title set VTS. In this connection, the VDP system 40 detects the number of titles included in each video title set and a program chain for each title associated with each video title set by referring to the video title set program chain information table information VTS_PGCITI included in the video title set program chain information table VTS_PGCIT as stated previously with reference to FIG. 4.

Then, the VDP system 40 retrieves and identifies a program chain playback time PGC_PB_TM as stated previously with reference to FIG. 5, retrieves the next program chain by referring to the program chain navigation control information PGC_Navigation Control as stated previously with reference to FIG. 5, and accumulates a playback time PGC_PB_TM of the retrieved next program chain. When the next program chain number Next_PGCN of the program chain navigation control information becomes the last program chain number Last_PGCN, the VDP system 40 obtains the playback time accumulated up to that time as a playback time length, or data length, of the current title.

After performing the foregoing operation with respect to all the titles, the VDP system 40 selects and reproduces any one of the titles having the longest playback time as a main title.

Figure 6:
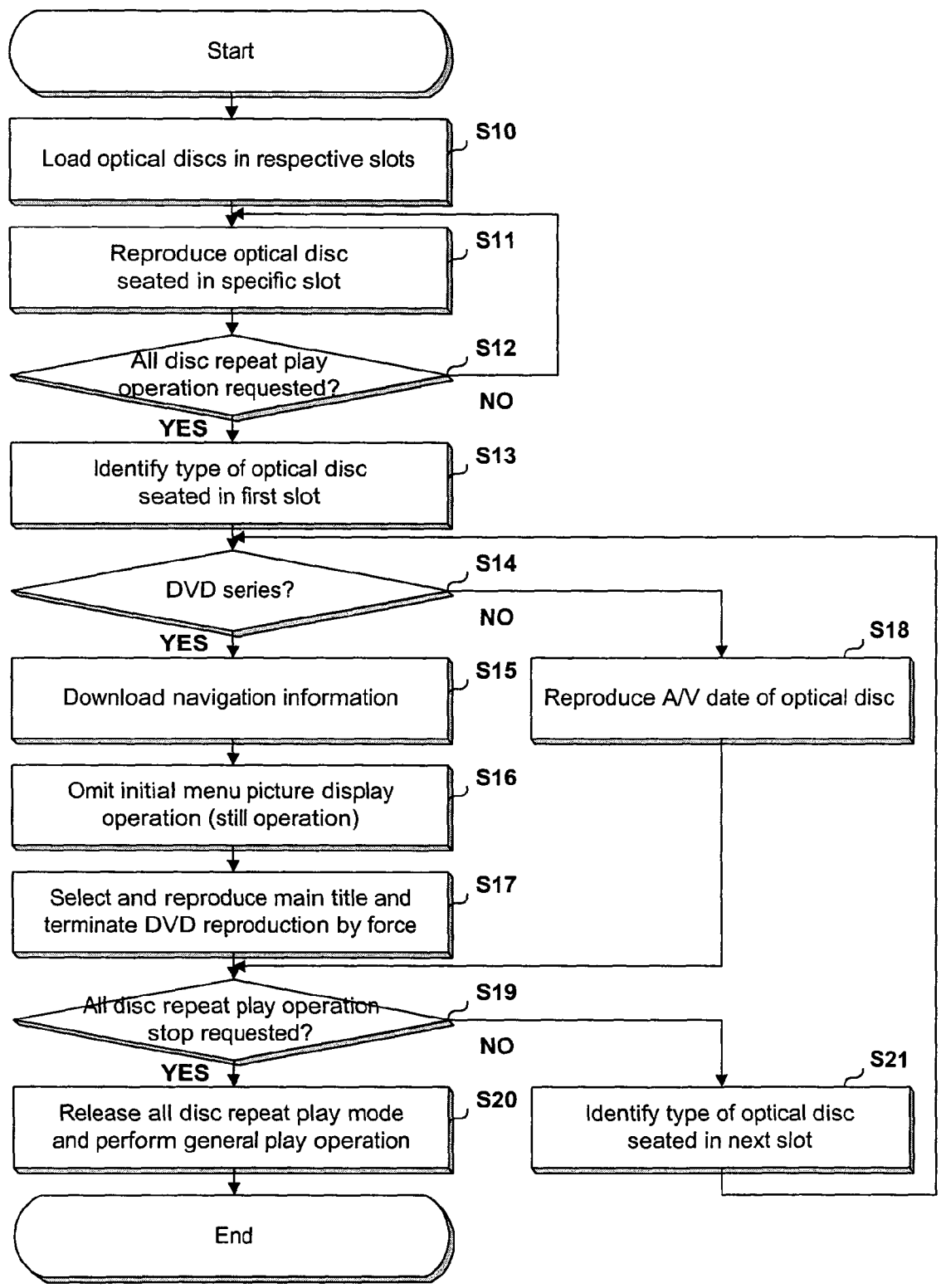
FIG. 6 is a flow chart illustrating the optical disc reproduction method according to the present invention.

FIG. 6 is a flow chart illustrating the optical disc reproduction method according to the present invention, which is applicable to a multi-disc changer or an optical disc apparatus such as a general DVD player.

Figure 1:
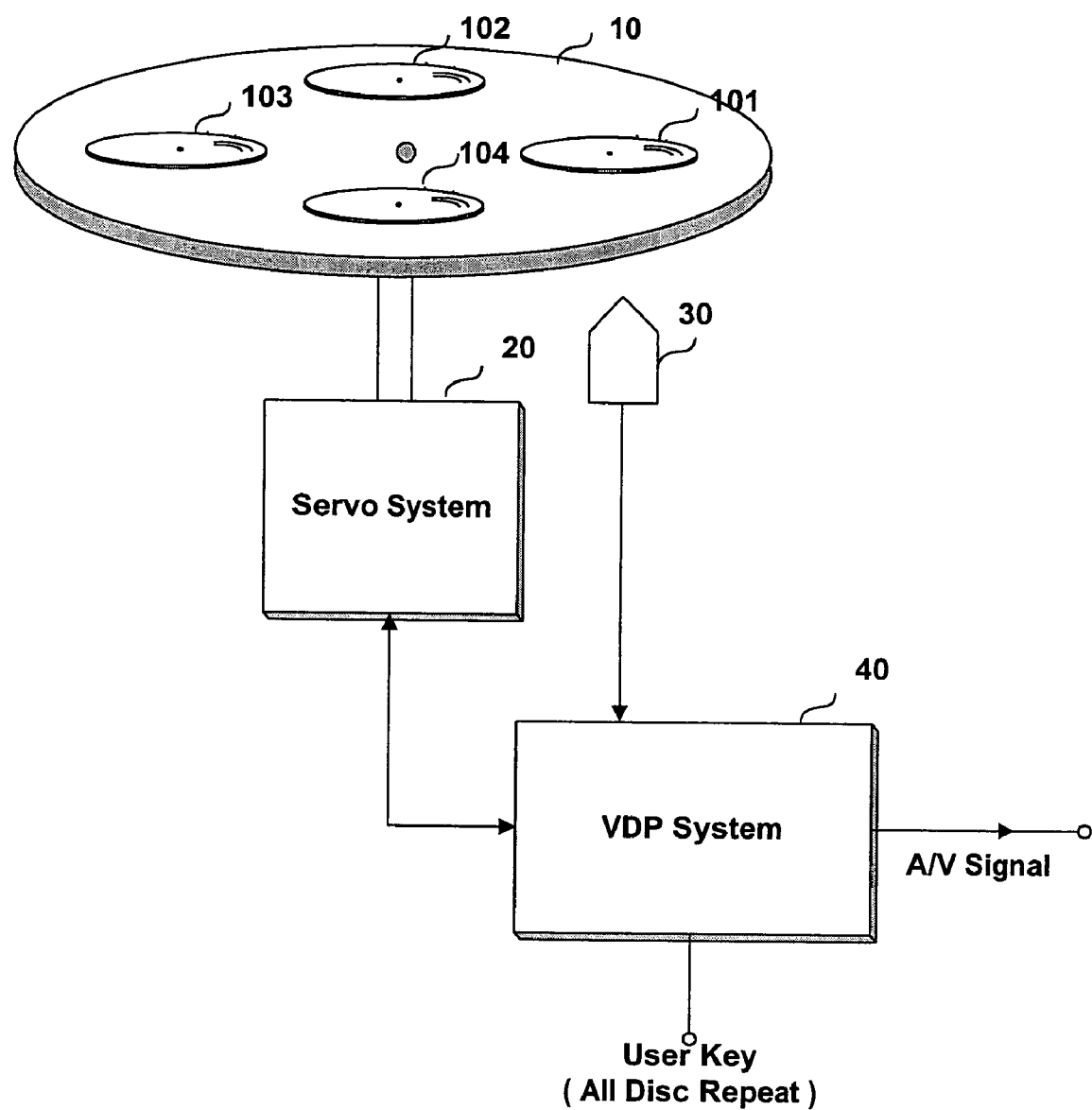
FIG. 1 is a block diagram schematically showing the construction of a general multi-disc changer.

First, a plurality of optical discs are seated respectively in the slots of the multi-tray 10 of the multi-disc changer constructed as described previously with reference to FIG. 1 (S10) If a user requests playback of the optical disc in a specific slot, then the VDP system 40 identifies a number of the specific slot and rotates the multi-tray for the optical disc to be located at a position readable by the optical pickup 30. The VDP system 40 then performs a reproduction operation of processing an RF signal read by the optical pickup 30 and outputting the resulting signal to an external device, such as a television set or audio set (S11).

On the other hand, in the case where the user requests an 'all disc repeat play' operation or an 'all disc successive play' operation (S12), the VDP system 40 identifies the type of the optical disc seated in, for example, the first slot 101 of the multi-tray 10 (S13). The VDP system 40 can identify the type of the optical disc by performing a focus servo operation or by retrieving disc type information Disc_Type recorded in a lead-in area (LIA) of the DVD as shown in FIG. 7.

In the case where the type of the optical disc identified in the above manner is determined to be a DVD type (S14), the VDP system 40 reads and downloads navigation information, such as video management information VMGI recorded in a data area of the DVD (S15).

Figure 2:
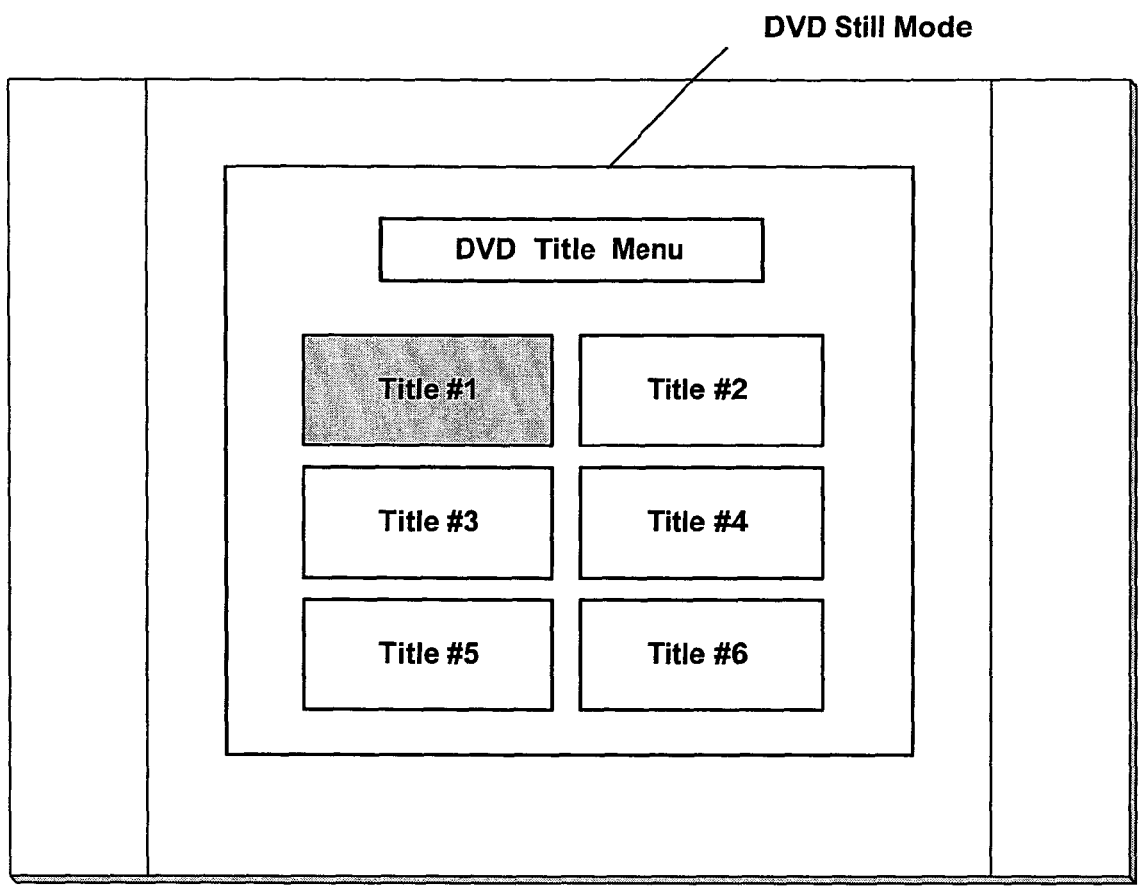
FIG. 2 is a view showing an example of a DVD title menu picture outputted and displayed in a still mode in the general multi-disc changer.

The VDP system 40 then retrieves and identifies a start address of each title Title_Start_Address included in the downloaded navigation information, so that it omits a typical initial operation of outputting and displaying a DVD title menu picture in a still mode as stated previously with reference to FIG. 2 (S16).

Figure 7:
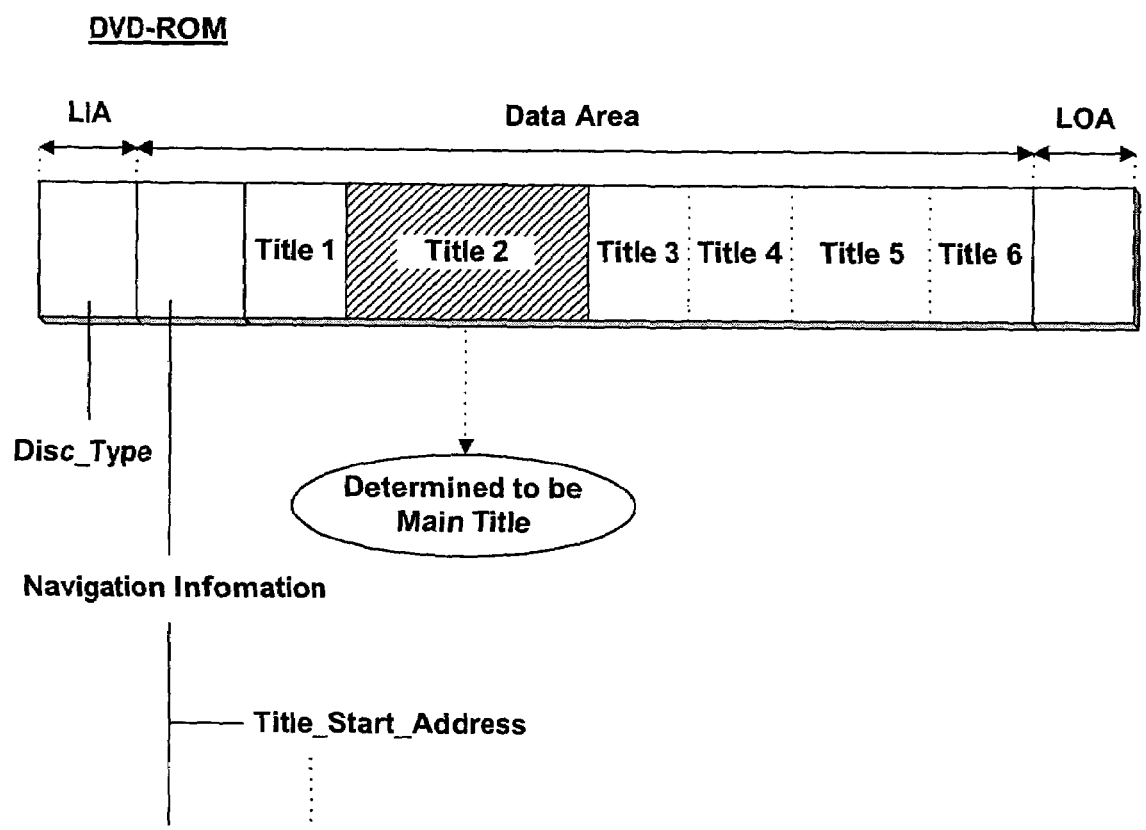
FIG. 7 is a view showing an example of a main title of a DVD selected and reproduced by the optical disc reproduction method according to the present invention.

As shown in FIG. 7, the VDP system 40 also selects any one title with the longest playback time from among a plurality of titles recorded in the data area as a main title with reference to the start address of each title in the navigation information, and reproduces only A/V data corresponding to the main title by force. If the reproduction of the main title is completed, then the VDP system 40 terminates the reproduction of the DVD by force so that the menu picture might not be displayed in the still mode (S17).

As an alternative, where content type information for each title Title_Content_Type is included in the navigation information, the VDP system 40 can select and reproduce only a title other than titles such as an advertisement, a production note, etc., for example, a title of A/V data corresponding to a movie or music.

On the other hand, where the identified optical disc type is not a DVD-series optical disc type, but, for example, a CD-series optical disc type, the VDP system 40 performs a typical play operation (S18).

Thereafter, if the user makes no request to stop the all disc repeat play operation (S19), the VDP system 40 identifies the type of the optical disc seated in the next slot (S21) and then repeats the above steps S14~S18 according to the identified optical disc type. However, upon receiving the user's request to stop the all disc repeat play operation, the VDP system 40 releases the repeat play mode and performs the general play operation (S20).

For reference, in the case of identifying the type of an optical disc corresponding to the DVD series under the condition that a user requests the 'all disc repeat play' operation, as stated above, the VDP system may perform a series of operations of identifying the type of an optical disc seated in the next slot, while omitting a reproduction operation for the DVD-series optical disc. In this case, there is a problem in that the VDP system cannot reproduce a title recorded on the DVD-series optical disc.

Figure 8:
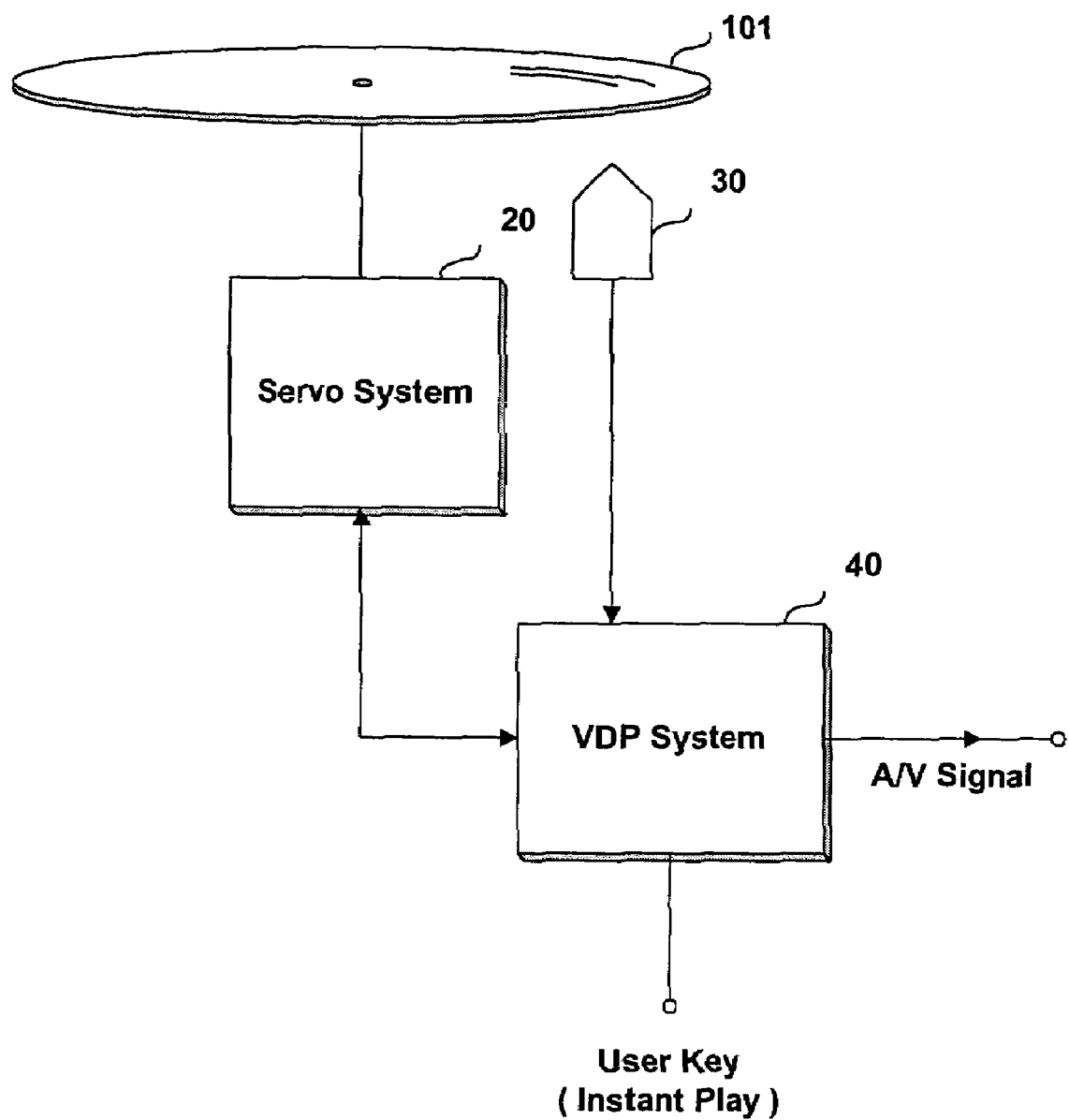
FIG. 8 is a block diagram schematically showing the construction of a general DVD player to which the optical disc reproduction method according to the present invention is applied.

Further, in an optical disc apparatus such as a general DVD player where only one DVD is loaded as shown in FIG. 8, the VDP system instantly reproduces and outputs a main title in the above manner if an 'instant play mode' is set by a user, but outputs and displays a typical menu picture as a still picture if a general play mode is set by a user.

As apparent from the above description, the present invention provides a method for reproducing an optical disc having a plurality of titles, which is capable of efficiently preventing an all disc repeat play operation, an all disc successive play operation or an instant play operation from being interrupted due to the display of a menu picture.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for reproducing information from an optical disc having a plurality of titles that correspond to a respective number of video programs stored separately on said optical disc, said method comprising:
    a) detecting information indicative of respective playback times of the video programs corresponding to said titles stored on said optical disc, wherein the information indicative of the playback times for each of the video programs of said titles are included with or within management information stored in a predetermined area of the disc; and
    b) selecting and reproducing one of said titles of said optical disc with reference to the detected title playback times, wherein b) includes:
        determining a first title corresponding to a first video program having a first playback time;
        determining a second title corresponding to a second video program having a second playback time;
        comparing the first and second playback times;
        determining that the first title that corresponds to the first video program stored on said disc has a longest playback time based on the comparison, and
        selecting and forcibly reproducing the first video program corresponding to the first title with the longest playback time, said determining and selecting automatically performed in response to a user command to reproduce information from said optical disc.

2. The method as set forth in claim 1, wherein a) and b) are performed when the user command selects an instant play mode in a displayed title menu.

3. The method as set forth in claim 1, wherein said optical disc having said plurality of titles is a digital versatile disc (DVD).

4. The method as set forth in claim 1, wherein a) includes:
    a-1) retrieving navigation information of said optical disc; and
    a-2) detecting the respective playback times of said titles on the basis of the retrieved navigation information.

5. The method as set forth in claim 4, wherein said navigation information includes information about the number of said titles, information about respective start addresses of said titles and information about the respective playback times of said titles.

6. The method as set forth in claim 5, wherein:
    said titles each include video data stored separately in predetermined units;
    said navigation information further includes information about playback orders of said video data and information about playback times of said video data together; and
    said playback time of each of said titles is detected as the sum of said playback times of said video data.

7. A method for reproducing information stored on an optical disc having a plurality of titles that correspond to a respective number of video programs stored separately on said optical disc, said method comprising:
    a) receiving a user's request to perform an all disc successive play operation with respect to a plurality of discs loaded in an optical disc apparatus;
    b) identifying a type of a specific disc to be currently reproduced among said plurality of discs;
    c) if the identified disc type corresponds to said optical disc having the plurality of titles that correspond to the separately stored video programs, then detecting information indicative of respective playback times of the plurality of titles of said specific disc, wherein the playback times information for each of said titles are included with or within management information stored in a predetermined area of the disc; and
    d) selecting and reproducing one of said titles of said specific disc with reference to the detected title playback times, wherein d) includes:
        determining a first title corresponding to a first video program having a first playback time;
        determining a second title corresponding to a second video program having a second playback time;
        comparing the first and second playback times;
        determining that the first title that corresponds to the first video program stored on said disc has a longest playback time based on the comparison, and selecting and forcibly reproducing the first video program corresponding to the first title with the longest playback time, said determining and selecting automatically performed in response to the user's request.

8. The method as set forth in claim 7, wherein said specific disc having a plurality of titles is a DVD.

9. The method as set forth in claim 7, wherein c) comprises:
detecting the respective playback times of said titles of said specific disc on the basis of navigation information of said specific disc.

10. The method as set forth in claim 9, wherein:
said titles each include video data stored separately in predetermined units;
said navigation information includes information about playback orders of said video data and information about playback times of said video data together; and
said playback time of each of said titles is detected as the sum of said playback times of said video data.

11. The method as set forth in claim 7, further comprising:
e) if the reproduction of said specific disc is completed, then successively reproducing a next one of said plurality of discs.

12. A method for reproducing information stored on an optical disc having a plurality of titles that correspond to a respective number of video programs stored separately on said optical disc, said method comprising:
a) identifying a type of a specific optical disc located at a position readable by an optical pickup when an all disc repeat play mode is set in a multi-disc changer under the condition that a plurality of optical discs including the specific optical disc are loaded in said multi-disc changer, said changer being adapted to wait at a menu picture before or after DVD reproduction in a general play mode;
b) if the identified optical disc type corresponds to a DVD, forcibly reproducing one of a plurality of titles recorded on said DVD on the basis of navigation information stored in a predetermined area of said DVD, said navigation information including information indicative of playback times for each of said titles, the one of said titles forcibly reproduced selected based on a corresponding one of the playback times information stored in said predetermination of the playback times stored in said predetermined area of the DVD;
c) terminating the reproduction of said DYD by force if the title reproduction is completed; and
d) rotating a multi-tray in order for the disc seated in a next slot to be located at said position readable by said optical pickup, wherein b) includes:
determining a first title corresponding to a first video program having a first playback time;
determining a second title corresponding to a second video program having a second playback time;
comparing the first and second playback times;
determining that the first title has a longest playback time based on the comparison, and
selecting and forcibly reproducing the first video program having the first title with the longest playback time, the first video program automatically selected and forcibly reproduced in response to a user command setting the all disc repeat play mode of the multi-disc changer.

13. The method as set forth in claim 12, wherein said forcible reproduction and termination are performed by omitting the operation of waiting at said menu picture before or after the DVD reproduction.

* * * * *